(12) United States Patent
Hirayama et al.

(10) Patent No.: US 6,950,797 B1
(45) Date of Patent: Sep. 27, 2005

(54) VOICE REFERENCE APPARATUS, RECORDING MEDIUM RECORDING VOICE REFERENCE CONTROL PROGRAM AND VOICE RECOGNITION NAVIGATION APPARATUS

(75) Inventors: Yoshikazu Hirayama, Zama (JP); Yoshiyuki Kobayashi, Zama (JP)

(73) Assignee: Xanavi Informatics Corporation, Zama (JP)

( * ) Notice: Subject to any disclaimer, the term of this patent is extended or adjusted under 35 U.S.C. 154(b) by 0 days.

(21) Appl. No.: 09/659,066

(22) Filed: Sep. 11, 2000

(30) Foreign Application Priority Data

Sep. 9, 1999 (JP) ................................. 11-255981

(51) Int. Cl.⁷ ............................................ G10L 17/00
(52) U.S. Cl. ..................................................... 704/246
(58) Field of Search ................................ 704/246, 270, 704/275

(56) References Cited

U.S. PATENT DOCUMENTS

| | | | |
|---|---|---|---|
| 5,826,233 A * | 10/1998 | Matsumoto | 704/275 |
| 5,956,684 A * | 9/1999 | Ishii et al. | 704/275 |
| 6,067,521 A * | 5/2000 | Ishii et al. | 704/275 |
| 6,073,076 A * | 6/2000 | Crowley et al. | 701/208 |
| 6,081,803 A * | 6/2000 | Ashby et al. | 707/4 |
| 6,122,593 A * | 9/2000 | Friederich et al. | 701/202 |
| 6,173,279 B1 * | 1/2001 | Levin et al. | 707/5 |
| 6,184,823 B1 * | 2/2001 | Smith et al. | 342/357.13 |
| 6,249,742 B1 * | 6/2001 | Friederich et al. | 701/202 |
| 6,292,745 B1 * | 9/2001 | Robare et al. | 701/208 |

FOREIGN PATENT DOCUMENTS

| | | |
|---|---|---|
| DE | 197 17 601 | 10/1997 |
| EP | 0 633 452 | 1/1995 |
| EP | 0675 341 | 10/1995 |
| EP | 0 768 638 | 4/1997 |
| JP | 07-064480 | 3/1995 |
| JP | 09-292255 | 11/1997 |

* cited by examiner

Primary Examiner—David L. Ometz
Assistant Examiner—Michael N. Opsasnick
(74) Attorney, Agent, or Firm—Crowell & Moring LLP

(57) ABSTRACT

A voice reference apparatus that classifies a plurality of search targets into a plurality of division blocks, searches for a search target by first specifying a division block and then specifying the search target and enables specification of, at least, the search target to be made by voice, includes: a first storage device in which recognition data related to search targets corresponding to individual division blocks are stored; a second storage device in which division block-related information indicating one or more other division blocks related to a given division block through a specific relationship is stored; a recognition data selection device that selects recognition data corresponding to only a certain division block and one or more other division blocks related to the certain division block specified by the division block-related information from the first storage device, when the certain division block has been specified; and a voice recognition processing device that performs voice recognition based upon voice recognition data generated by using the recognition data selected by the recognition data selection device and audio data corresponding to the search target specified by voice.

15 Claims, 12 Drawing Sheets

FIG. 1
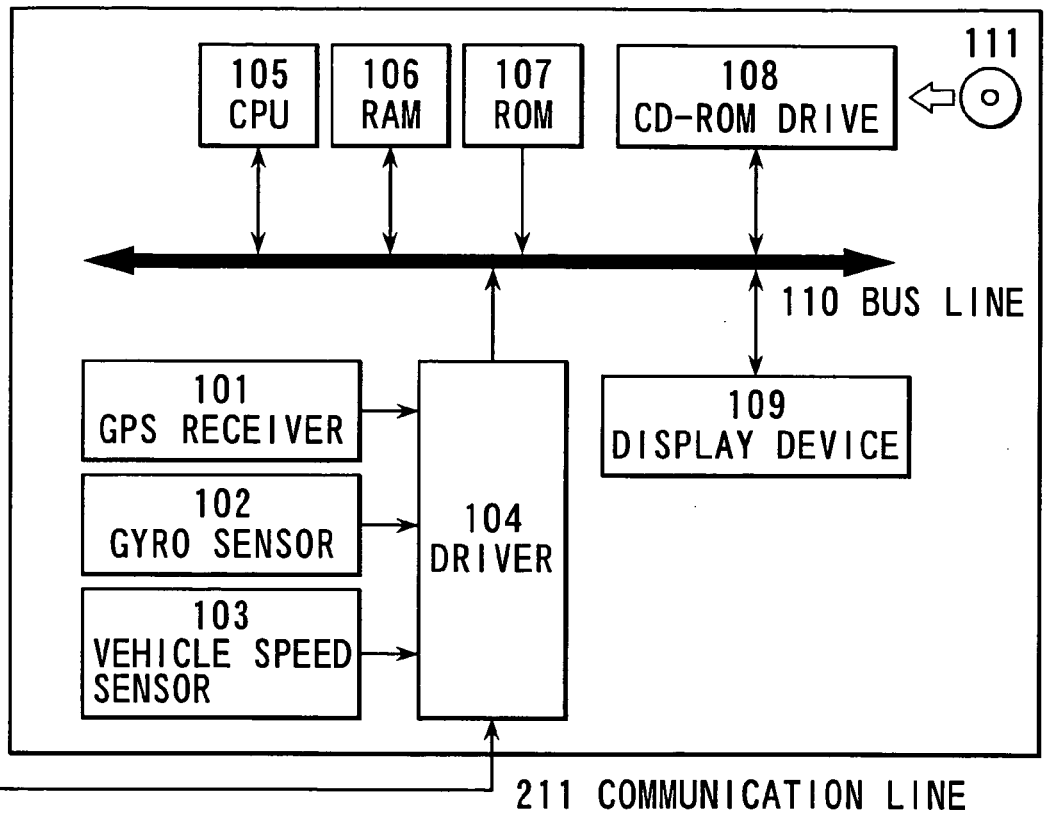
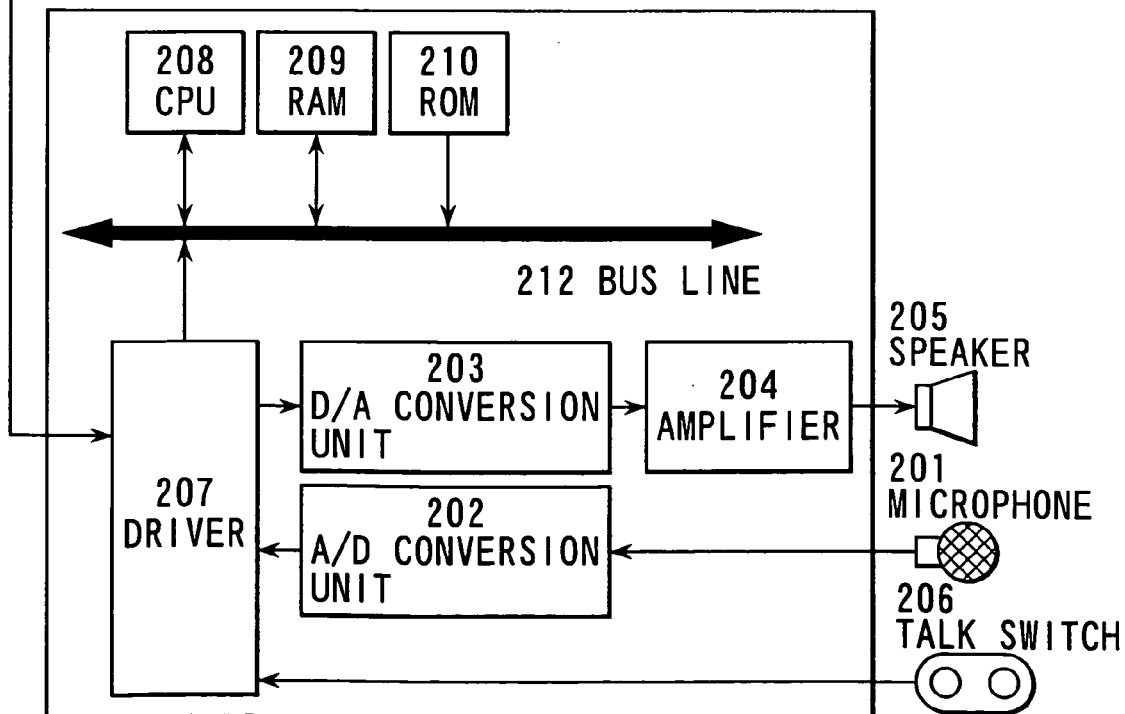

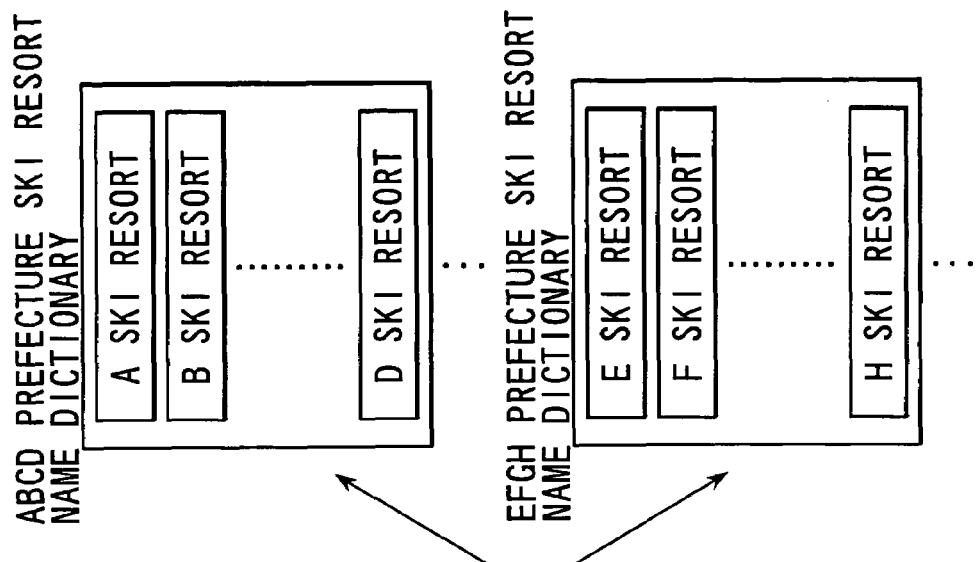
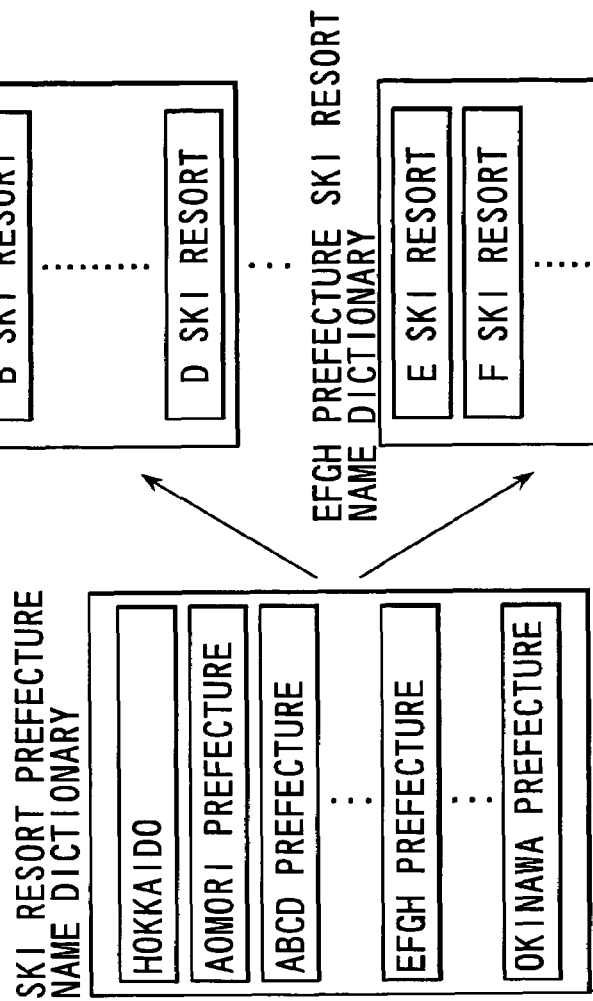
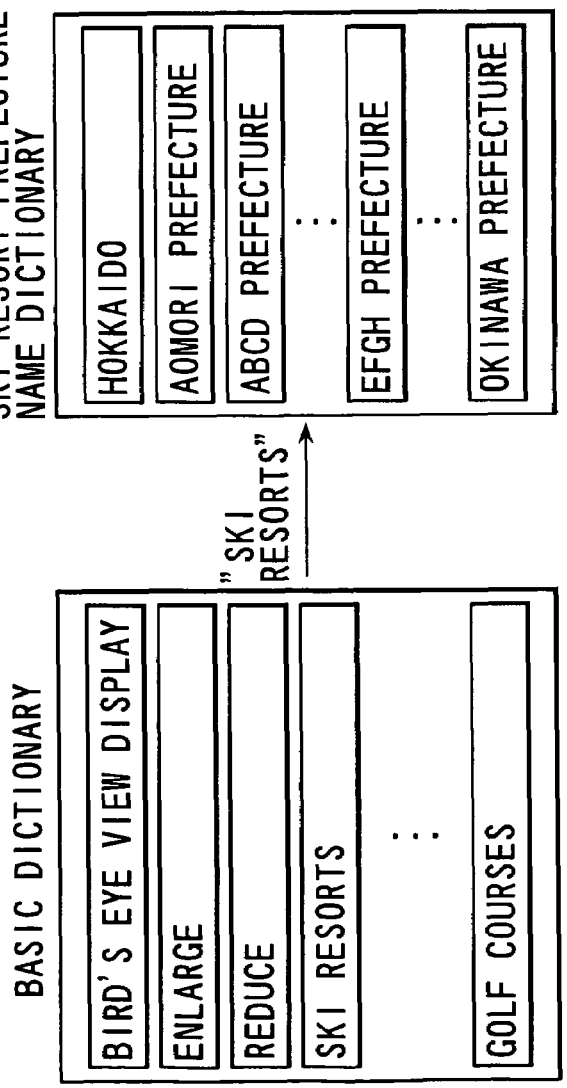

FIG. 4A

| TARGET PREF. CODE | | NEIGHBORING PREF. CODE | | | | | | | | |
|---|---|---|---|---|---|---|---|---|---|---|
| HOKKAIDO | 01 | AOMORI | 02 | | | | | | | |
| AOMORI | 02 | HOKKAIDO | 01 | IWATE | 03 | AKITA | 05 | | | |
| IWATE | 03 | AOMORI | 02 | MIYAGI | 04 | AKITA | 05 | | | |
| MIYAGI | 04 | IWATE | 03 | AKITA | 05 | YAMAGATA | 06 | FUKUSHIMA | 07 | |
| AKITA | 05 | AOMORI | 02 | IWATE | 03 | MIYAGI | 04 | YAMAGATA | 06 | |
| YAMAGATA | 06 | IWATE | 03 | MIYAGI | 04 | AKITA | 05 | FUKUSHIMA | 07 | NIIGATA 15 |
| FUKUSHIMA | 07 | MIYAGI | 04 | YAMAGATA | 06 | IBARAKI | 08 | TOCHIGI | 09 | NIIGATA 15 GUNMA 10 |
| IBARAKI | 08 | FUKUSHIMA | 07 | TOCHIGI | 09 | GUNMA | 10 | SAITAMA | 11 | CHIBA 12 |
| TOCHIGI | 09 | FUKUSHIMA | 07 | IBARAKI | 08 | GUNMA | 10 | SAITAMA | 11 | CHIBA 12 |
| GUNMA | 10 | FUKUSHIMA | 07 | IBARAKI | 08 | TOCHIGI | 09 | SAITAMA | 11 | NIIGATA 15 YAMANASHI 19 NAGANO 20 |
| SAITAMA | 11 | IBARAKI | 08 | TOCHIGI | 09 | GUNMA | 10 | CHIBA | 12 | TOKYO 13 YAMANASHI 19 NAGANO 20 |
| CHIBA | 12 | IBARAKI | 08 | TOCHIGI | 09 | GUNMA | 10 | SAITAMA | 11 | TOKYO 13 KANAGAWA 14 |
| TOKYO | 13 | SAITAMA | 11 | CHIBA | 12 | KANAGAWA | 14 | YAMANASHI | 19 | |
| KANAGAWA | 14 | CHIBA | 12 | TOKYO | 13 | YAMANASHI | 19 | SHIZUOKA | 22 | |
| NIIGATA | 15 | YAMAGATA | 06 | FUKUSHIMA | 07 | GUNMA | 10 | TOYAMA | 16 | NAGANO 20 |
| TOYAMA | 16 | NIIGATA | 15 | ISHIKAWA | 17 | NAGANO | 20 | GIFU | 21 | |
| ISHIKAWA | 17 | TOYAMA | 16 | FUKUI | 18 | GIFU | 21 | | | |
| FUKUI | 18 | ISHIKAWA | 17 | GIFU | 21 | SHIGA | 25 | KYOTO | 26 | |
| YAMANASHI | 19 | GUNMA | 10 | SAITAMA | 11 | TOKYO | 13 | KANAGAWA | 14 | NAGANO 20 SHIZUOKA 22 |
| NAGANO | 20 | GUNMA | 10 | SAITAMA | 11 | NIIGATA | 15 | TOYAMA | 16 | YAMANASHI 19 GIFU 21 |
| GIFU | 21 | TOYAMA | 16 | NAGANO | 20 | FUKUI | 17 | NAGANO | 18 | AICHI 20 MIE 23 SHIGA 24 AICHI 23 SHIZUOKA 22 |
| SHIZUOKA | 22 | KANAGAWA | 14 | YAMANASHI | 19 | NAGANO | 20 | AICHI | 23 | |
| AICHI | 23 | NAGANO | 20 | GIFU | 21 | SHIZUOKA | 22 | MIE | 24 | SHIGA 25 |

FIG. 4B

| TARGET PREF. CODE | NEIGHBORING PREF. CODE | | | | | | | |
|---|---|---|---|---|---|---|---|---|
| MIE 24 | GIFU 21 | AICHI 21 | SHIGA 23 | KYOTO 25 | NARA 26 | WAKAYAMA 29 | | |
| SHIGA 25 | FUKUI 18 | GIFU 21 | MIE 24 | KYOTO 24 | NARA 26 | | | |
| KYOTO 26 | FUKUI 18 | MIE 24 | SHIGA 25 | OSAKA 25 | HYOGO 27 | NARA 28 | WAKAYAMA 29 | |
| OSAKA 27 | KYOTO 26 | HYOGO 26 | NARA 28 | WAKAYAMA 29 | | | | |
| HYOGO 28 | KYOTO 26 | OSAKA 26 | TOTTORI 27 | OKAYAMA 31 | TOKUSHIMA 33 | KAGAWA 37 | | |
| NARA 29 | MIE 24 | SHIGA 25 | KYOTO 25 | OSAKA 26 | WAKAYAMA 27 | | | |
| WAKAYAMA 30 | MIE 24 | OSAKA 24 | NARA 28 | HYOGO 29 | TOKUSHIMA 36 | | | |
| TOTTORI 31 | HYOGO 28 | SHIMANE 32 | OKAYAMA 33 | HIROSHIMA 34 | | | | |
| SHIMANE 32 | OKAYAMA 31 | HIROSHIMA 33 | YAMAGUCHI 34 | | | | | |
| OKAYAMA 33 | TOTTORI 28 | SHIMANE 31 | HIROSHIMA 32 | HIROSHIMA 34 | KAGAWA 37 | | | |
| HIROSHIMA 34 | TOTTORI 31 | SHIMANE 32 | OKAYAMA 33 | YAMAGUCHI 35 | KAGAWA 37 | EHIME 38 | | |
| YAMAGUCHI 35 | SHIMANE 32 | HIROSHIMA 34 | EHIME 38 | FUKUOKA 40 | OITA 44 | EHIME 38 | | |
| TOKUSHIMA 36 | HYOGO 28 | WAKAYAMA 30 | KAGAWA 37 | EHIME 38 | KOCHI 39 | | | |
| KAGAWA 37 | HYOGO 28 | OKAYAMA 33 | HIROSHIMA 34 | TOKUSHIMA 36 | EHIME 38 | KOCHI 39 | | |
| EHIME 38 | OKAYAMA 33 | HIROSHIMA 34 | YAMAGUCHI 35 | TOKUSHIMA 36 | KAGAWA 36 | KOCHI 37 | OITA 39 | |
| KOCHI 39 | TOKUSHIMA 36 | KAGAWA 37 | EHIME 38 | | | | | |
| FUKUOKA 40 | YAMAGUCHI 35 | SAGA 41 | NAGASAKI 42 | KUMAMOTO 43 | OITA 44 | | | |
| SAGA 41 | FUKUOKA 40 | NAGASAKI 42 | KUMAMOTO 43 | | | | | |
| NAGASAKI 42 | SAGA 40 | KUMAMOTO 41 | | | | | | |
| KUMAMOTO 43 | FUKUOKA 40 | SAGA 41 | NAGASAKI 42 | OITA 44 | MIYAZAKI 45 | KAGOSHIMA 46 | | |
| OITA 44 | YAMAGUCHI 35 | EHIME 38 | FUKUOKA 40 | KUMAMOTO 43 | MIYAZAKI 45 | | | |
| MIYAZAKI 45 | KUMAMOTO 43 | OITA 43 | KAGOSHIMA 46 | | | | | |
| KAGOSHIMA 46 | KUMAMOTO 43 | MIYAZAKI 45 | | | | | | |
| OKINAWA 47 | KAGOSHIMA 46 | | | | | | | |

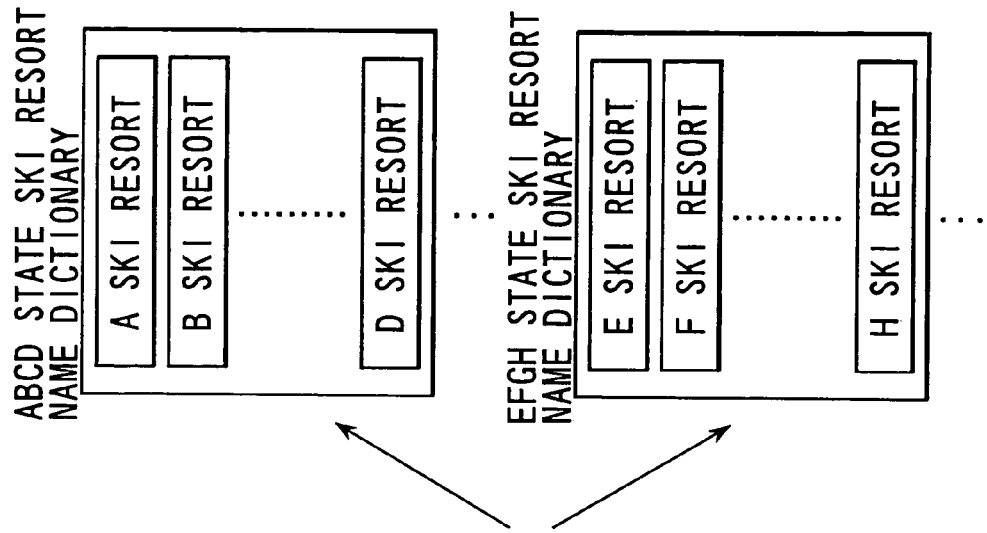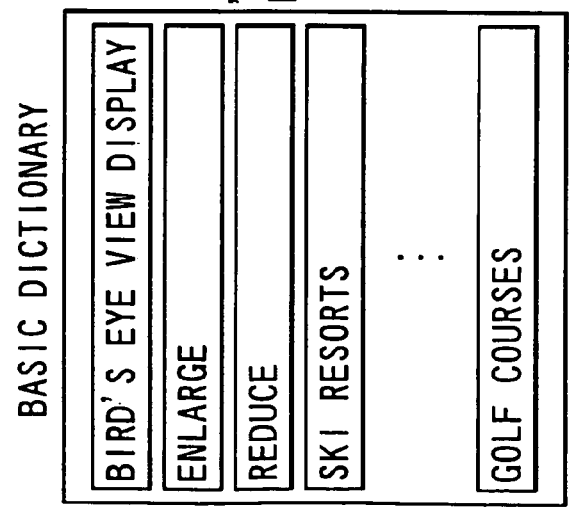

VOICE REFERENCE APPARATUS, RECORDING MEDIUM RECORDING VOICE REFERENCE CONTROL PROGRAM AND VOICE RECOGNITION NAVIGATION APPARATUS

INCORPORATION BY REFERENCE

The disclosure of the following priority application is herein incorporated by reference:

Japanese Patent Application No. 11-255981 filed Sep. 9, 1999.

BACKGROUND OF THE INVENTION

1. Field of the Invention

The present invention relates to a voice reference system and a voice recognition navigation apparatus using the voice reference system.

2. Description of the Related Art

There are car navigation apparatuses (hereafter referred to as navigation apparatuses) that display the current position of the vehicle, display a map over a wide area or in detail and provide guidance to the driver along the traveling direction over the remaining distance to the destination in the prior art. There are also voice recognition navigation apparatuses in the prior art having a function of enabling the driver engaged in driving to issue operating instructions by voice to improve driver safety (see Japanese Laid-Open Patent Publication No. 09-292255, for instance).

FIGS. 11A~11D illustrate the concept of voice recognition dictionaries (hereafter simply referred to as dictionaries) used in a navigation apparatus in the prior art to display a desired ski resort in a map through voice instructions.

When the power to the navigation apparatus is turned on, the basic dictionary shown in FIG. 11A is opened in the memory. In the basic dictionary, instruction phrases such as "bird's eye view display," "enlarge," "reduce" and "ski resorts" are stored as recognition words. If the user says (vocalizes) "ski resorts" to specify a facility category, voice recognition processing is performed on all the recognition words in the basic dictionary. When "ski resorts" is recognized as the result of the voice recognition processing, a ski resort prefecture name dictionary, which contains prefecture names where ski resorts are present as recognition words is opened in memory, as shown in FIG. 11B.

Then, if the user says "ABCD Prefecture," for instance, to specify the prefecture where the desired ski resort is present, voice recognition processing is performed on all the recognition words in the prefecture name dictionary. If "ABCD Prefecture" is recognized as the result of the voice recognition processing, an ABCD Prefecture ski resort name dictionary containing the names of ski resorts present in ABCD Prefecture as recognition words is opened in memory as shown in FIG. 11C. Next, the user says "B Ski Resort" to specify a ski resort, and in response, voice recognition processing is performed on all the recognition words in the ABCD Prefecture ski resort name dictionary. After "B Ski Resort" is recognized through the voice recognition processing, a map containing B Ski Resort is displayed on the screen of the navigation apparatus as shown in FIG. 11D.

In addition to ski resorts, there are various facility categories that need to be recognized by the voice recognition software program, such as theme parks and airports. Many of such facilities are located near prefectural borders. For instance, there is a ski resort located near the prefectural border of Gunma Prefecture and Niigata Prefecture, a theme park located near the prefectural border of Tokyo Prefecture and Chiba Prefecture and an airport located near the prefectural border of Osaka Prefecture and Hyogo Prefecture. In addition, in the case of a vast facility such as a golf course or a ski resort, the user may not be certain which prefecture the facility belongs to.

If the user inputs the wrong prefecture when specifying the prefecture where the facility is located in such a situation, the facility name dictionary in the wrong prefecture where the facility is not located is opened in memory and accessed. Thus, a problem occurs in that a successful recognition is not achieved no matter how many times the user subsequently says the accurate facility name.

SUMMARY OF THE INVENTION

An object of the present invention is to provide a voice reference apparatus capable of performing a search for a reference target through voice recognition quickly, efficiently and accurately with a high degree of reliability and a recording medium that records a control program used in the process. More specifically, the object of the present invention is to provide a voice recognition navigation apparatus capable of achieving accurate voice recognition of the names of facilities located near the borders of public administrative zones (districts).

In order to attain the above object, a voice reference apparatus according to the present invention that classifies a plurality of search targets into a plurality of division blocks, searches for a search target by first specifying a division block and then specifying the search target and enables specification of, at least, the search target to be made by voice, comprises: a first storage device in which recognition data related to search targets corresponding to individual division blocks are stored; a second storage device in which division block-related information indicating one or more other division blocks related to a given division block through a specific relationship is stored; a recognition data selection device that selects recognition data corresponding to only a certain division block and one or more other division blocks related to the certain division block specified by the division block-related information from the first storage device, when the certain division block has been specified; and a voice recognition processing device that performs voice recognition based upon voice recognition data generated by using the recognition data selected by the recognition data selection device and audio data corresponding to the search target specified by voice.

In this voice reference apparatus, it is preferred that: the plurality of division blocks are public administrative zones; the search target is located in one of the public administrative zones; and the division block-related information indicates one or more other public administrative zones related to a specified public administrative zone through a specific relationship. In this case, it is preferred that: the public administrative zones are each constituted of a prefecture, a state or a country. Also, it is preferred that the division block-related information indicates one or more other public administrative zones adjacent to a specified public administrative zone. In this case, it is preferred that the recognition data related to the search target includes information related to a public administrative zone in which the search target is located. Furthermore, it is preferred that a display control device that implements control to display details related to results of a search of the search target on a display device is further provided, and when implementing control to display the details related to the results of the search of the search target, the display control device also displays on the display device information related to the public administrative zone in which the search target is located.

A voice recognition navigation apparatus according to the present invention, comprises: a voice reference apparatus; a map information storage device that stores map information; and a control device that implements control for providing route guidance based upon, at least, results of a search performed by the voice reference apparatus and the map information. And the voice reference apparatus, which classifies a plurality of search targets into a plurality of division blocks, searches for a search target by first specifying a division block and then specifying the search target and enables specification of, at least, the search target to be made by voice, comprises: a first storage device in which recognition data related to search targets corresponding to individual division blocks are stored; a second storage device in which division block-related information indicating one or more other division blocks related to a given division block through a specific relationship is stored; a recognition data selection device that selects recognition data corresponding to only a certain division block and one or more other division blocks related to the certain division block specified by the division block-related information from the first storage device, when the certain division block has been specified; and a voice recognition processing device that performs voice recognition based upon voice recognition data generated by using the recognition data selected by the recognition data selection device and audio data corresponding to the search target specified by voice.

A recording medium according to the present invention that records a voice reference control program for searching for a search target specified by voice, by first specifying a division block and then specifying the search target. The control program comprises: an instruction for reading recognition data related to search targets, a plurality of the search targets being classified into a plurality of division blocks; an instruction for reading data related to division block-related information indicating one or more other division blocks related to a given block through a specific relationship; an instruction for selecting recognition data corresponding to only a certain division block and one or more other division blocks related to the certain division block specified by the division block-related information when the certain division block has been specified; and an instruction for implementing a voice recognition based upon voice recognition data generated by using the recognition data that have been selected and audio data corresponding to the search target specified by voice.

A data signal according to the present invention is transmitted in a communication line and comprises a voice reference control program for searching for a search target specified by voice, by first specifying a division block and then specifying the search target. And the control program comprises: an instruction for reading recognition data related to search targets, a plurality of the search targets being classified into a plurality of division blocks; an instruction for reading data related to division block-related information indicating one or more other division blocks related to a given block through a specific relationship; an instruction for selecting recognition data corresponding to only a certain division block and one or more other division blocks related to the certain division block specified by the division block-related information when the certain division block has been specified; and an instruction for implementing a voice recognition based upon voice recognition data generated by using the recognition data that have been selected and audio data corresponding to the search target specified by voice.

BRIEF DESCRIPTION OF THE DRAWINGS

FIG. 1 illustrates the structure assumed by the car navigation system according to the present invention in a first embodiment;

FIGS. 2A~2C show recognition dictionaries related to the ski resort category among recognition dictionaries used in the first embodiment;

FIGS. 4A and 4B present an example of how neighboring prefectures may be assigned for each prefecture;

FIGS. 8A~8C show recognition dictionaries related to the ski resort category among recognition dictionaries used in a second embodiment, presenting an example in which an area is divided in units of individual states;

DESCRIPTION OF THE PREFERRED EMBODIMENTS

First Embodiment

Figure 3:
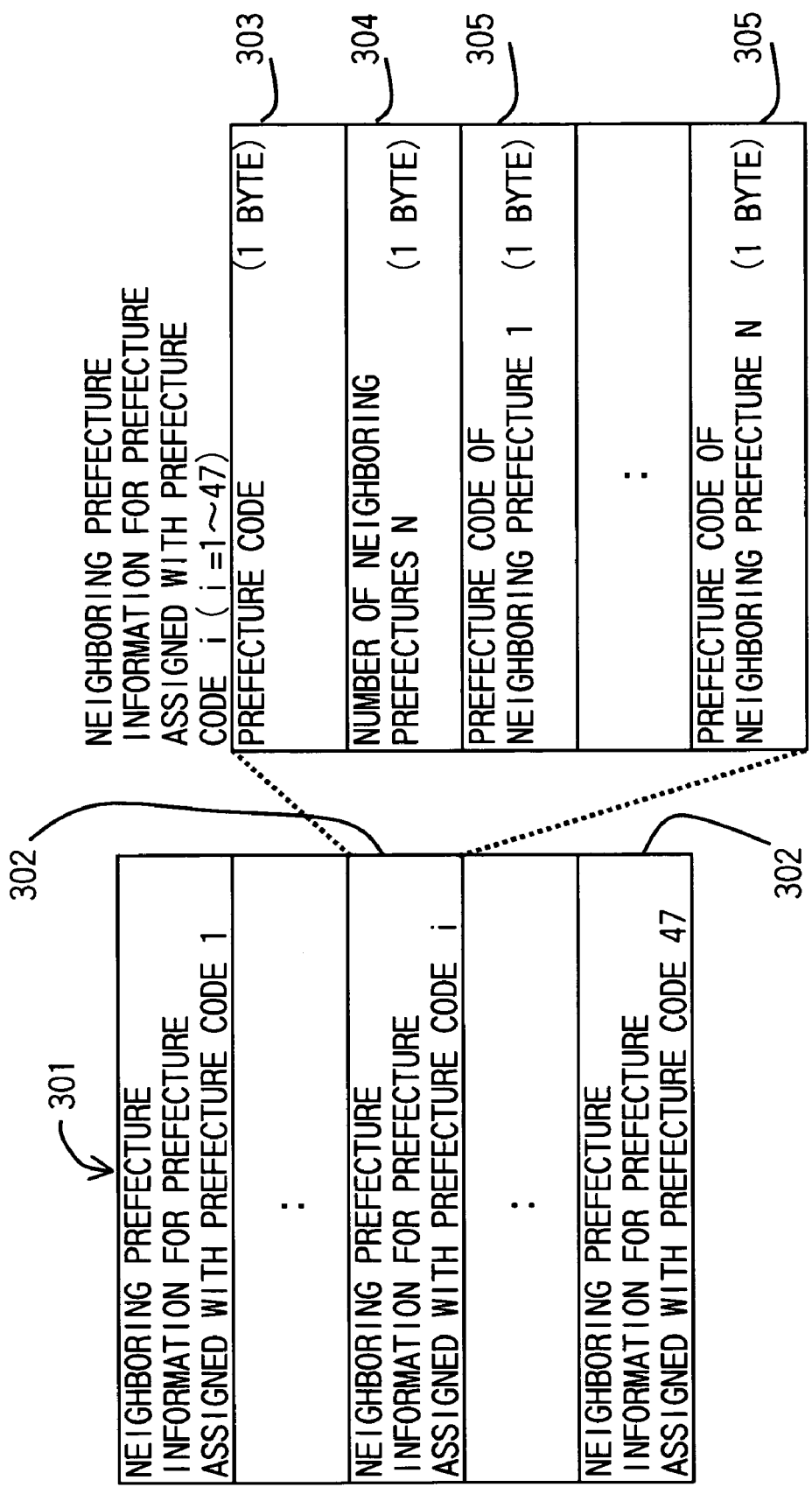
FIG. 3 shows a neighboring prefecture table.

FIG. 1 shows the structure adopted by the car navigation system in the first embodiment of the present invention. The car navigation system comprises a navigation apparatus 100 and a voice unit 200.

The navigation apparatus 100 comprises a GPS receiver 101, a gyro sensor 102, a vehicle speed sensor 103, a driver 104, a CPU 105, a RAM 106, a ROM 107, a CD-ROM drive 108, a display device 109, a bus line 110 and the like.

The voice unit 200 comprises a microphone 201, an A/D conversion unit 202, a D/A conversion unit 203, an amplifier 204, a speaker 205, a TALK switch 206, a driver 207, a CPU 208, a RAM 209, a ROM 210, a bus line 212 and the like. The navigation apparatus 100 and the voice unit 200 are connected with each other via a communication line 211.

The GPS receiver 101 receives a signal from a GPS (Global Positioning System) satellite and detects the absolute position and the absolute bearing of the vehicle. The gyro sensor 102, which may be constituted of, for instance, a vibrating gyro, detects the yaw angle speed of the vehicle. The vehicle speed sensor 103 detects the distance traveled by the vehicle based upon the number of pulses output each time the vehicle has traveled over a specific distance. The two dimensional movement of the vehicle is detected by the gyro sensor 102 and the vehicle speed sensor 103. The driver 104 is provided to connect signals from the GPS receiver 101, the gyro sensor 102 and the vehicle speed sensor 103 with the bus line 110. In other words, the outputs from the individual sensors are converted to data that can be read by the CPU 105.

The CPU 105 controls the entire navigation apparatus 100 by executing a program stored in the ROM 107. In the RAM 106, which is constituted of volatile memory, a work data area is secured. In the ROM 107 constituted of non volatile memory, the control program mentioned above and the like are stored. The CD-ROM drive 108 uses a CD-ROM 111 as a recording medium to store road map information such as vector road data and the like. The CD-ROM drive may be alternatively constituted of another recording device such as a DVD drive which uses a DVD as a recording medium. The display device 109 displays a road map that contains the current position and the surrounding area of the vehicle, route information indicating the route to the destination, the intersection information indicating the next intersection to which the vehicle is to be guided and the like. It may be constituted of, for instance, a liquid crystal display device or a CRT. The bus line 110 is provided to connect the components of the navigation apparatus 100 such as the CPU 105 via a bus.

The voice unit 200 performs voice-related processing such as voice recognition and voice synthesis. The TALK switch 206 is pressed by the user to give an instruction for a start of voice recognition. Audio data are input via the microphone 201 over a specific period of time after the TALK switch 206 is pressed. The sound thus input is converted to digital audio data by the A/D conversion unit 202 and the driver 207.

In the ROM 210 of the voice unit 200, a voice recognition software program, a voice synthesis software program, voice recognition dictionaries (hereafter simply referred to as recognition dictionaries), a voice synthesis dictionary (hereafter simply referred to as a synthesis dictionary) and the like are stored. In the voice recognition software program, correlation values between the digital audio data and all the recognition words in a recognition dictionary are calculated and the recognition word achieving a largest correlation value is determined to be the recognition results. In the voice synthesis program, data needed to output a specified phrase through the speaker are calculated. Since both software programs are of the known art, their detailed explanation is omitted.

A recognition dictionary is constituted of a set of data compiled with a plurality of words and phrases to be used in voice recognition. More specifically, pronunciation data corresponding to individual words specified with Hiragana, Katakana, Roman characters or phonetic symbols (the corresponding character codes, in reality) are stored in the recognition dictionary. The words and phrases stored in the recognition dictionary are referred to as recognition words. The character data corresponding to the recognition word and information such as the corresponding coordinate information if the recognition word represents a facility name as well as the pronunciation data are attached to each recognition word. Details of the recognition dictionaries are to be given later. In the synthesis dictionary, sound source data and the like necessary for voice synthesis are stored.

When a speech is completed, the CPU 208 executes the voice recognition software program by using the RAM 209, the ROM 210 and the like to perform a voice recognition of the digital audio data. The voice recognition software program references the pronunciation data (data specified in Hiragana, Katakana or Roman characters) of the recognition words in the recognition dictionary to generate the voice recognition data corresponding to the recognition words and calculates the correlation values between the voice recognition data and the digital audio data. It calculates the correlation values between all the recognition words and the digital audio data and determines the recognition word achieving the highest correlation value which is also equal to or larger than a specific value before ending the voice recognition. The echo-back word linked to the recognition word is then converted to special speech data by using the voice synthesis software program. Then, the CPU 208 engages the D/A conversion unit 203, the amplifier 204 and the speaker 205 to output the recognition results through echo-back.

If all the correlation values thus calculated are equal to or smaller than the specific value, the CPU 208 decides that voice recognition has failed and thus no navigation operation is executed. More specifically, it may sound a beep indicating that a voice recognition attempt has failed or it may sound a response echo-back such as "recognition failed." The bus line 212 is provided for the voice unit 200.

Next, a detailed explanation is given on the recognition dictionaries. The recognition dictionaries include a basic dictionary containing recognition words related to instructions, prefecture name dictionaries containing recognition words related to prefecture names corresponding to various categories and prefecture facility name dictionaries each containing recognition words related to the names of facilities in a given prefecture in a given category. The prefecture names used to specify prefectures, too, should be regarded as a type of instruction phrase.

FIGS. 2A–2C show recognition dictionaries related to the ski resort category among the recognition dictionaries. The basic dictionary shown in FIG. 2A is a dictionary commonly used among various categories, and contains recognition words related to instructions such as "bird's eye view display," "enlarge," "reduce" and "ski resorts." In the ski resort prefecture name dictionary shown in FIG. 2B, recognition words related to the names of prefectures where ski resorts are present are stored. In the ABCD Prefecture ski resort name dictionary shown in FIG. 2C, recognition words related to the names of ski resorts located in ABCD Prefecture are stored, whereas in the EFGH Prefecture ski resort name dictionary in FIG. 2C, recognition words related to the names of ski resorts present in EFGH Prefecture are stored. In addition to the ABCD Prefecture ski resort name dictionary and the EFGH Prefecture ski resort name dictionary in FIG. 2C, ski resort dictionaries corresponding to the individual prefectures listed in the ski resort prefecture name dictionary in FIG. 2B are provided.

A recognition word is constituted of pronunciation data for a given phrase, it is specified by hiragana, katakana, Roman character, pronunciation symbol or the like and the corresponding character code or the like is stored as the recognition word, the items in FIGS. 2A–2C are expressed using Kanji and the like to facilitate the explanation.

It is to be noted that the names of ski resorts in the entire country are stored in a hierarchical structure in units of individual prefectures for the following reason. Let us assume that a single ski resort name dictionary, in which the names of all the ski resorts in the country are stored, is provided without the ski resort prefecture name dictionary in FIG. 2B. In this case, for each ski resort name to be recognized through voice recognition, all the ski resort names in the recognition dictionary must undergo the voice recognition processing and a great deal of time will be required for the processing. In addition, since the number of items to undergo recognition processing is large, the chance of erroneous recognition rises. Furthermore, the entire recognition dictionary may not be opened in the memory at once due to limits imposed on the work memory capacity. Thus, the names of ski resorts in the country are stored in the hierarchical structure in units of individual prefectures and are processed as described above.

If the golf course category is specified, a golf course prefecture name dictionary and golf course name dictionaries corresponding to the individual prefectures are prepared (not shown). The dictionaries related to other categories such as theme parks are prepared in a similar manner. In other words, as recognition dictionaries, the basic dictionary, prefecture dictionaries in various categories and facility name dictionaries corresponding to the individual prefectures in each category are prepared.

In this embodiment, a neighboring prefecture table is stored in the ROM 210 in addition to the recognition dictionaries. FIG. 3 presents the neighboring prefecture table. a neighboring prefecture table 301 contains neighboring prefecture information for each of the 47 prefectures in the country (in case of Japan). Neighboring prefecture information 302 for each prefecture includes data indicating a prefecture code 303 which represents the target prefecture itself, the number of neighboring prefectures 304 and neighboring prefecture codes 305.

Any of various methods may be adopted to assign neighboring prefectures. For instance, all the prefectures geographically adjacent to a given prefecture at its prefectural border may be assigned, prefectures that are considered to be nearby may be assigned, prefectures which should be regarded as neighboring prefectures as dictated by experience may be assigned or prefectures located along an expressway passing through the prefecture may be assigned as neighboring prefectures. FIGS. 4A and 4B present an example of neighboring prefectures assigned for the individual prefectures in Japan.

In the embodiment, if a given prefecture name is specified by voice when searching for a facility in a given category, the neighboring prefecture table described above is employed and the facility name dictionary corresponding to a neighboring prefecture of the specified prefecture, too, is opened in memory. As a result, when searching for a facility located near the prefectural border, it can be found with ease even if a neighboring prefecture is specified by mistake.

Figure 5:
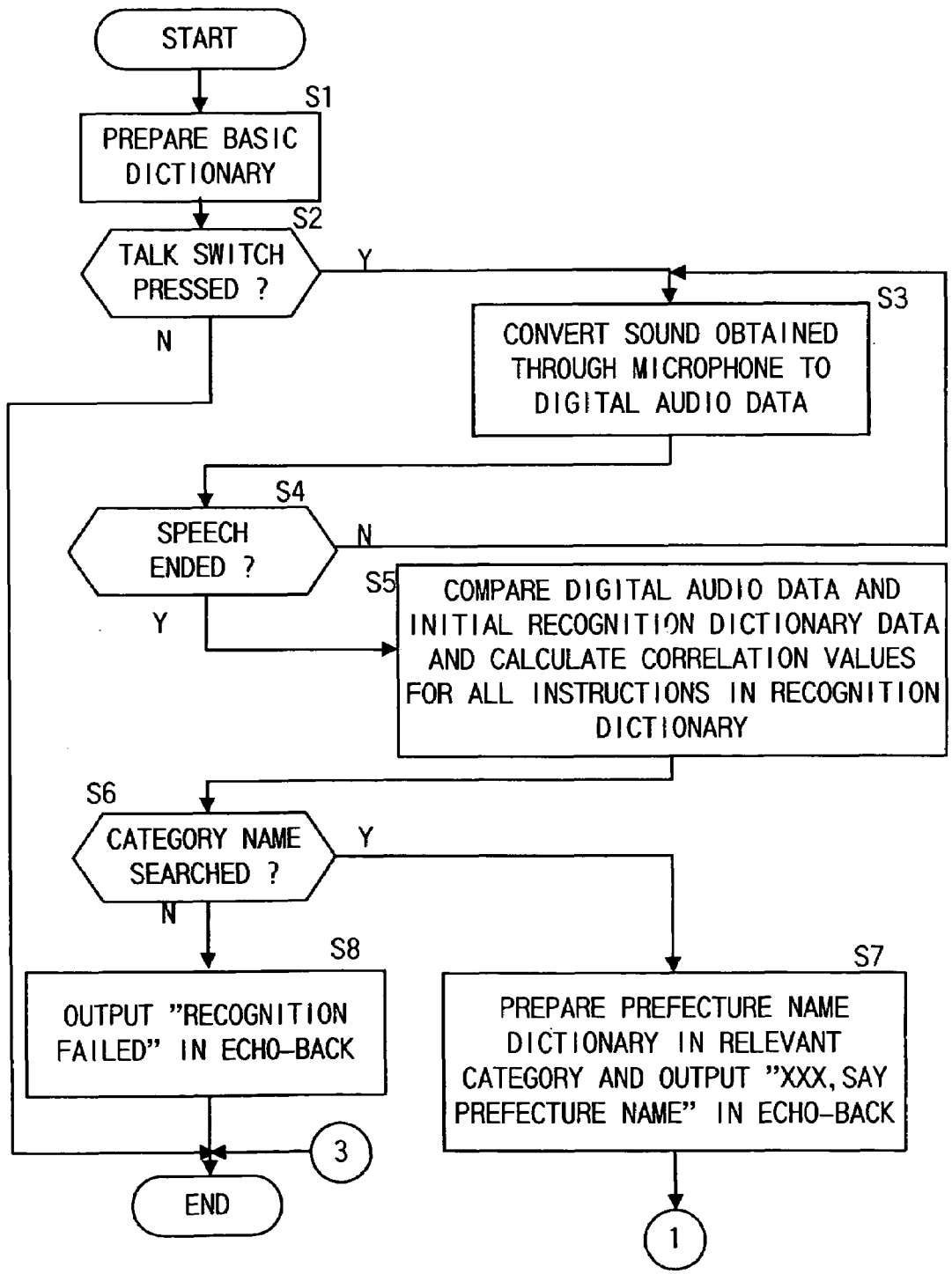
FIG. 5 is a flowchart of the control implemented to reference the name of a facility in a given prefecture.
Figure 6:
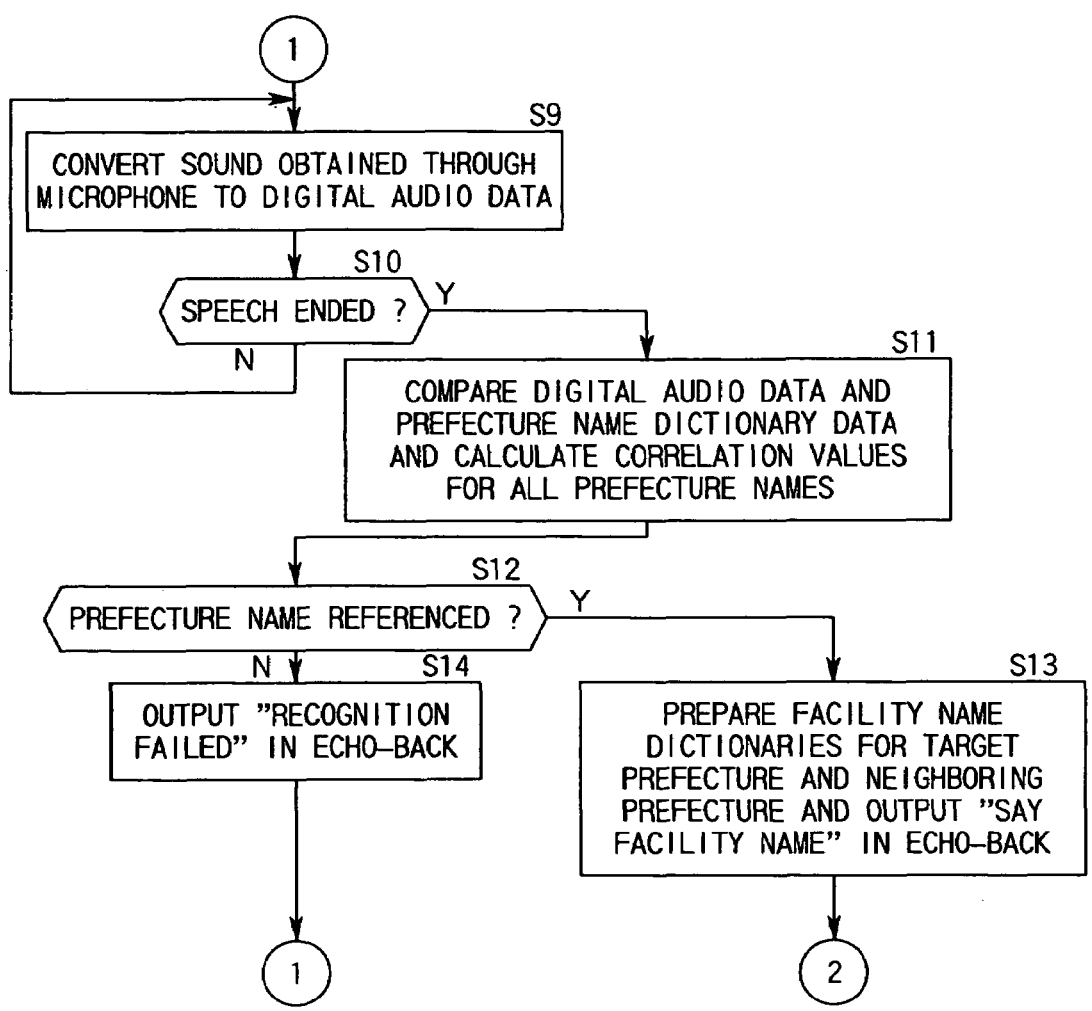
FIG. 6 is a flowchart continuing from the flowchart in FIG. 5.
Figure 7:
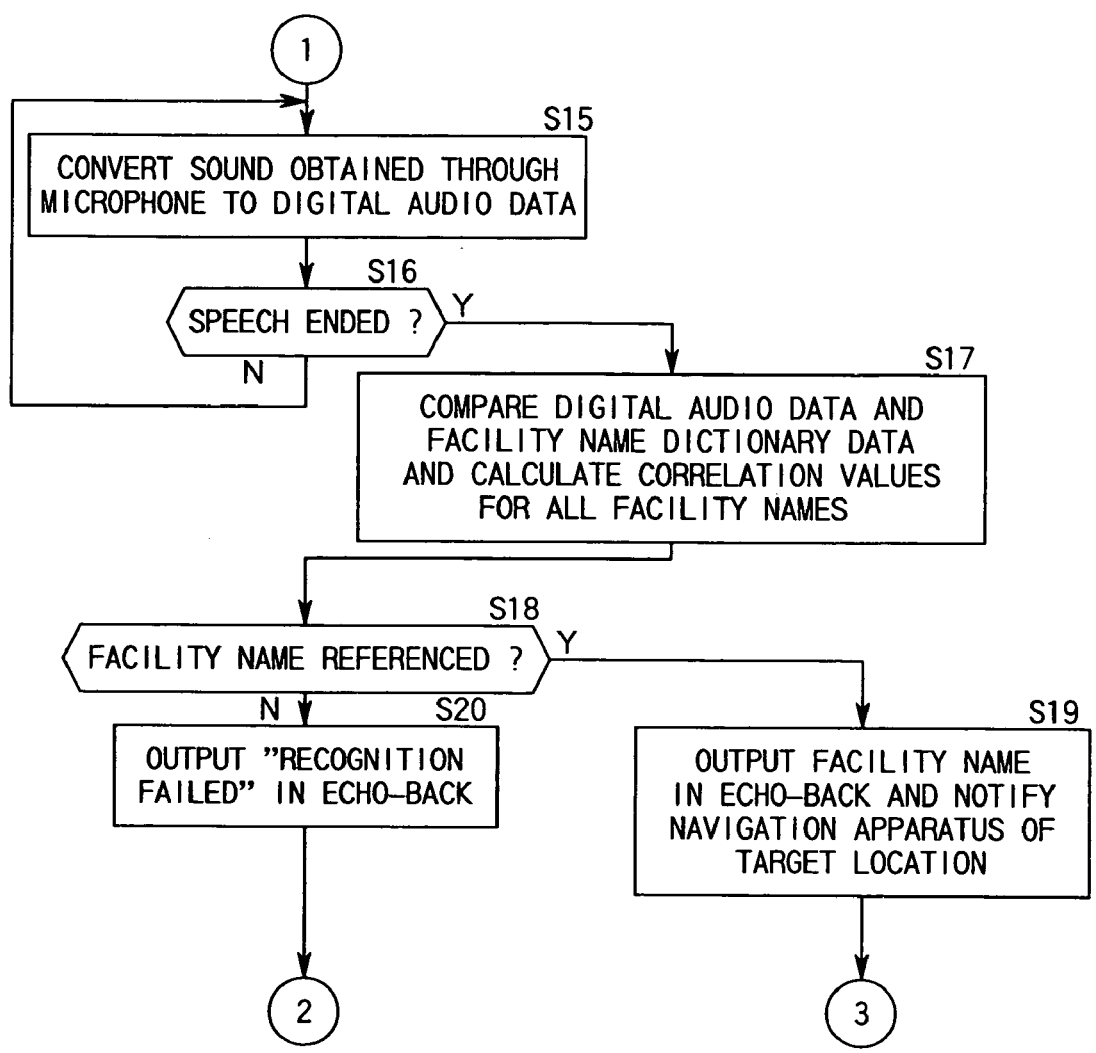
FIG. 7 is a flowchart continuing from the flowchart in FIG. 6.

FIGS. 5~7 present a flowchart of the control implemented to search for the name of a facility located in a given prefecture on the voice unit 200. Now, an explanation is given on a specific example in which ABCD Prefecture is erroneously specified when searching for F Ski Resort located in EFGH Prefecture adjacent to ABCD Prefecture. The control program, which is stored in the ROM 210, is executed by the CPU 208. The routine is started up by turning on the power to the navigation apparatus 100 and the voice unit 200.

In step S1, the basic dictionary shown in FIG. 2A stored in the ROM 210 is read out and opened in the RAM 209. The basic dictionary in the ROM 210 is opened in the RAM 209 to increase the processing speed. If the processing speed is not a crucial issue, the dictionary in the ROM 210 may be accessed directly. In step S2, a decision is made as to whether or not the TALK switch 206 has been pressed, and if it is decided that the TALK switch 206 has been pressed, the operation proceeds to step S3. If, on the other hand, it is decided that the TALK switch 206 has not been pressed, the routine ends. After pressing the TALK switch 206, the user says (vocalizes), for instance, "ski resorts" within a specific period of time. In step S3, the audio signal obtained though the microphone 201 is converted to digital audio data. In step S4, a decision is made as to whether or not the speech has ended. A speech is judged to have ended when the audio signal lapses over a specific length of time. If it is decided that the speech has ended, the operation proceeds to step S5, whereas if it is decided that the speech has not ended, the operation returns to step S3. In this example, digital audio data corresponding to "ski resorts" are obtained in step S3.

In step S5, the correlation values between the digital audio data that have been obtained and all the recognition words in the basic dictionary are calculated before the operation proceeds to step S6. Namely, the correlation values between the digital audio data corresponding to "ski resorts" obtained in step S3 and the recognition words such as "bird's eye view display," "enlarge," "reduce," "ski resorts" and "golf courses" are calculated. In step S6, a decision is made as to whether or not the largest correlation value among the calculated correlation values is equal to or larger than a specific value. If it is determined to be equal to or larger than the specific value, it is assumed that the word or phrase has been recognized and the operation proceeds to step S7. In this example, the correlation value relative to the recognition word "ski resorts" is the largest. If the correlation value is equal to or larger than the specific value, it is decided that the phrase "ski resorts" has been recognized and a successful search of the category name has been achieved. In step S7, a voice message constituted of the recognition word that has achieved the largest correlation value and "say the prefecture name" is output. In the example, a message "ski resorts," "say the prefecture name" is echoed back by voice. In addition, the prefecture name dictionary in the relevant category is prepared in the RAM 209 in step S7. In the example, the "ski resort prefecture name dictionary" (see FIG. 2B) is opened in the RAM 209.

If, on the other hand, the largest correlation value is determined to be smaller than the specific value in step S6, it is assumed that the spoken word or phrase has not been recognized and the operation proceeds to step S8. In step S8, a voice message "recognition failed" is echoed back before the processing ends. The navigation apparatus 100 does not engage in any processing.

When the processing in step S7 is completed, the operation proceeds to step S9. In step S9, the audio signal obtained through the microphone 201 is converted to digital audio data as in step S3. In step S10, a decision is made as to whether not the speech has ended as in step S4. During this interval, the user says "ABCD Prefecture." By repeating steps S9 and S10, the digital audio data corresponding to "ABCD Prefecture" are obtained in the example.

In step S11, the correlation values between the digital audio data thus obtained and all the recognition words in the ski resort prefecture name dictionary are calculated before the operation proceeds to step S12. Namely, the correlation values between the digital audio data corresponding to "ABCD Prefecture" obtained in step S9 and the recognition words such as "Hokkaido," "Aomori Prefecture," "ABCD Prefecture," "EFGH Prefecture" and "Okinawa Prefecture" are calculated. In step S12, a decision is made as to whether or not the largest correlation value among the calculated correlation values is equal to or larger than a specific value. If, it is decided to be equal to or larger than the specific value, it is concluded that the word has been recognized and the operation proceeds to step S13. In the example, the correlation value relative to the recognition word "ABCD Prefecture" is the largest. If this correlation value is equal to or larger than the specific value, the phrase "ABCD Prefecture" has been recognized and the ski resort prefecture name has been successfully referenced. In step S13, a voice message constituted of the recognition word that has achieved the largest correlation value and "say the facility name" is output. In the example, "ABCD Prefecture. Say the facility name" is echoed back.

In addition, the facility name dictionary for the target prefecture and the facility name dictionary for a neighboring prefecture are opened in the RAM 209 in step S13. Since the name of the target prefecture has been obtained in step S12, the neighboring prefecture table (see FIG. 3) stored in the ROM 210 is accessed to obtain the neighboring prefecture information for the target prefecture. Based upon the neighboring prefecture information, the facility name dictionary corresponding to a neighboring prefecture is opened in the RAM 209. As a result, the target prefecture facility name dictionary and a neighboring prefecture facility name dictionary are incorporated and are prepared in the RAM 209 as if they constitute a single target prefecture facility name dictionary. In the example, in which EFGH Prefecture is a neighboring prefecture of ABCD Prefecture, "ABCD Prefecture ski resort name dictionary" and "EFGH ski resort name dictionary" are incorporated and prepared in the RAM 209.

It is to be noted that if the ROM 210 is accessed directly instead of opening the prefecture facility name dictionaries in the ROM 210 in the RAM 209, the target prefecture facility name dictionary and the neighboring prefecture facility name dictionary alone may be accessed sequentially.

If, on the other hand, it is decided in step S12 that the largest correlation value is smaller than the specific value, it is decided that the spoken word or phrase has not been recognized and the operation proceeds to step S14. In step S14, a voice message "recognition failed" is echoed back and the processing ends. The navigation apparatus 100 does not engage in any processing.

After the processing in step S13 is completed, the operation proceeds to step S15. In step S15, the audio signal obtained through the microphone 201 is converted to digital audio data as in step S3. In step S16, a decision is made as to whether not the speech has ended as in step S4. The user says, for instance, "° F. Ski Resort" during this interval. While the F Ski Resort is actually located in EFGH Prefecture, the user erroneously believes that the F Ski Resort is in ABCD Prefecture, since it is located near the prefectural border of ABCD Prefecture and EFGH Prefecture. By repeating step S15 and step S16, the digital audio data corresponding to "F Ski Resort" are obtained.

In step S17, the correlation values between the digital audio data that have been obtained and all the recognition words in the facility name dictionaries prepared in the RAM 209 are calculated, and the operation proceeds to step S18. As explained earlier, the facility name dictionary corresponding to the target prefecture and the facility name dictionary corresponding to the neighboring prefecture are prepared in the RAM 209, and the correlation values relative to all the recognition words in these dictionaries are calculated. In the example, correlation values between the digital audio data corresponding to "F Ski Resort" obtained in step S15 and all the recognition words representing the ski resort names in the "ABCD Prefecture ski resort name dictionary" and the "EFGH Prefecture ski resort name dictionary" are calculated.

In step S18, a decision is made as to whether or not the largest correlation value among the calculated correlation values is equal to or larger than a specific volume. If it is decided to be equal to or larger than the specific value, it is concluded that the word or phrase has been recognized and the operation proceeds to step S19. In the example, the correlation value relative to the recognition word "F Ski Resort" in the EFGH Prefecture ski resort name dictionary is the largest. If this correlation value is equal to or larger than the specific value, the phrase "F Ski Resort" has been recognized and a successful search of the facility name has been achieved. In step S19, the recognition word "F Ski Resort" achieving the largest correlation value is echoed back.

In addition, in step S19, the navigation apparatus 100 is notified that a valid facility name has been recognized before the processing ends. While the navigation apparatus 100 is notified, the coordinates of the facility on the map are also provided to the navigation apparatus 100. Additional information constituted of coordinate data indicating the coordinates of the corresponding facility is also stored in the recognition dictionary in correspondence to each recognition word. The navigation apparatus 100 displays a road map of the area around the facility on the display device 109 based upon the coordinate data indicating the coordinates of the facility on the map transmitted via the communication line 211.

If, on the other hand, the largest correlation value is determined to be smaller than the specific value in step S18, it is assumed that the spoken word has not been recognized and the operation proceeds to step S20. In step S20, "recognition failed" is echoed back by voice, before ending the processing. The navigation apparatus 100 does not engage in any processing, either.

As described above, even if the user erroneously specifies a neighboring prefecture when searching for a facility located in a given prefecture, the facility can be referenced in a reliable manner. In the example given above, even if the user erroneously specifies the neighboring "ABCD Prefecture" when searching for "F Ski Resort" located in "EFGH Prefecture," "F Ski Resort" can be referenced with a high degree of reliability. In addition, since it is not necessary to provide recognition words for the names of all the facilities in the country in the work memory, the target facility can be searched efficiently, quickly, accurately and reliably while requiring only a small work memory capacity.

It is to be noted that while an explanation is given above on an example in which "F Ski Resort" is located only in "EFGH Prefecture," there may be another ski resort also called "F Ski Resort" located in "ABCD Prefecture" by coincidence. In such a case, two correlation values achieving equally high levels will be referenced. These search results will be provided to the navigation apparatus 100, and in response, the following display will be brought up on the display device 109. It goes without saying that voice output may be concurrently performed at the voice unit 200.

"1: F Ski Resort (ABCD Prefecture) or;

2: F Ski Resort (EFGH Prefecture) ?"

The user inputs by voice the number he wishes to choose or inputs the number he wishes to choose through an input device (not shown) such as a remote control for the navigation apparatus. As a result, even when facilities having identical names are present in neighboring prefectures, the target facility can be selected with ease. It is desirable to attach information related to the name of the prefecture in which a given facility is located to each recognition word in the facility recognition dictionary. In such a case, since the name of the prefecture in which the facility is located can be displayed with ease in the selection screen described above, the user can make a selection without becoming confused. It goes without saying that the name of the prefecture may be ascertained and displayed by using the prefecture facility name dictionary containing the recognition word. It is to be noted that facilities with highly similar names located in neighboring prefectures, e.g., "F Ski Resort" located in "EFGH Prefecture" and "S Ski Resort" located in "ABCD Prefecture," may be handled in a similar manner.

Second Embodiment

An explanation has been given in reference to the first embodiment on an example in which the area is divided in units of individual prefectures in Japan. The dividing units of the area may be individual states in the USA, instead of the prefectures in Japan.

FIGS. 8A~8C show recognition dictionaries related to the ski resort category among recognition dictionaries, presenting an example in which the area is divided in units of individual states. They correspond to FIGS. 2A~2C illustrating the first embodiment. In the ski resort state name dictionary shown in FIG. 8B, recognition words corresponding to the names of states in which ski resorts are present are stored. In FIG. 8C, the ABCD State ski resort name dictionary contains recognition words corresponding to the names of ski resorts present in ABCD State and the EFGH State ski resort name dictionary contains recognition words corresponding to the names of ski resorts present in EFGH State. Ski resort name dictionaries corresponding to all the states listed in the ski resort state name dictionary in FIG. 2B are provided in addition to the ABCD State ski resort name dictionary and the EFGH State ski resort name dictionary in FIG. 2C.

In a recognition dictionary, spelling and the voice recognition data (e.g., phonetic symbols (pronunciation symbols)) of recognition words to undergo voice recognition processing are stored. Also, as in the first embodiment, information such as coordinate information is attached in the case of facility names.

Figure 9:
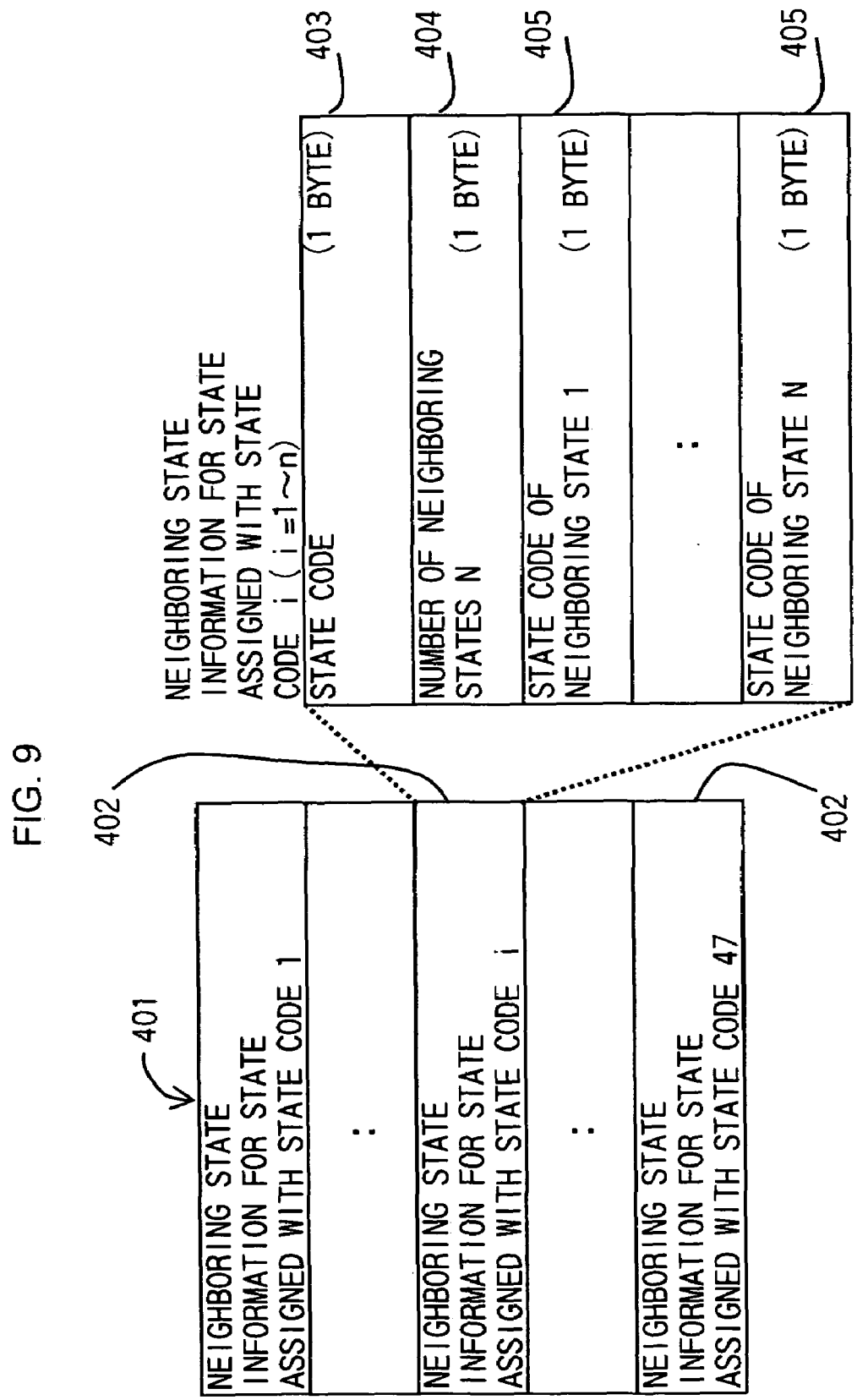
FIG. 9 presents a neighboring state table.

FIG. 9 shows a neighboring state table. It corresponds to FIG. 3 illustrating the first embodiment and is similar to FIG. 3 except for that the prefectures in FIG. 3 are replaced by the states. The assignment of neighboring states, too, may be made in a manner similar to the manner in which neighboring prefectures are assigned in the first embodiment.

Processing similar to that performed in the first embodiment is implemented by using the ski resort state name dictionary, the individual state ski resort name dictionary and the neighboring state table described above. Consequently, even if a neighboring state is specified by mistake when searching for a facility present in a given state, the target facility can be referenced with a high degree of reliability.

In the explanation given above, the area is divided in units of individual states in the United States. The present invention, however, may be adopted in conjunction with an area divided in units of public administrative zone units used in other countries. In other words, recognition dictionaries can be prepared in correspondence to zones (e.g., states, prefectures, districts and countries) resulting from the divisions made in conformance to the particulars of zone boundaries in the individual countries. In addition, if there are numerous small countries, as in Europe, the area may be divided in units of individual countries, as well.

While an explanation is given above in reference to the embodiments on an example in which the present invention is adopted in a car navigation system, the present invention is not limited to this example. It may be adopted in portable navigation apparatuses instead of navigation apparatuses mounted in vehicles. In addition, it may be adopted in a guide system installed in a building as well. In short, it may be adopted in all types of systems or apparatuses on which a search target among a plurality of search targets present in a plurality of divided zones is specified by voice.

While an explanation is given in reference to the first embodiment on an example in which the area is divided in units of individual prefectures, the present invention is not limited to this example, and the area may be divided in units of smaller municipalities or in units of individual regions such as the Kanto Region, the Tokai Region and the Kinki Region. In addition, it may be divided in units of individual floors or individual specific ranges on a given floor in the case of a guide system installed in a building. Furthermore, the search blocks do not need to represent geographical divisions, either. For instance, if the basic dictionary in FIG. 2A contains a recognition word "Restaurants," the dictionary which is equivalent to the dictionary shown in FIG. 2B may contain recognition words indicating different types of restaurants such as "French cuisine," "Chinese cuisine" and "Japanese cuisine," and the dictionaries that are equivalent to those in FIG. 2C may each contain the names of restaurants specializing in each cuisine. Also, the present invention may be adopted effectively when different types of "accommodations" are classified as "business hotels," "hotels" and "Japanese-style inns." In such a case, by assigning "business hotels" and "hotels" to classification categories that are similar to each other, a search can be performed with "business hotels" added as a search target when "hotels" is specified. Thus, even if "hotels" is erroneously specified to search for "ABC Hotel" which is classified as a business hotel, a successful search is achieved.

In addition, while an explanation is given in reference to the embodiments on an example in which a ski resort located in a given public administrative zone, the present invention is not limited to these particulars. Any targets, including street names, airport names and theme parks can be referenced. In other words, a search target may assume any form and its classification block, too, may assume any form in correspondence to the attributes of the search target.

While an explanation is given above in reference to the embodiments on a structure achieved by providing the navigation apparatus 100 and the voice unit 200 as separate units, the present invention is not limited to these particulars and may be adopted in an integrated navigation apparatus having an internal voice unit. In addition, the control program, the recognition dictionaries, the neighboring prefecture table and the like explained above may be provided in a recording medium such as the CD-ROM 111. Furthermore, the control program, the recognition dictionaries and the like may be provided in a recording medium such as a CD-ROM 111 and the system described above may be realized on a computer such as a personal computer or a workstation.

Figure 10:
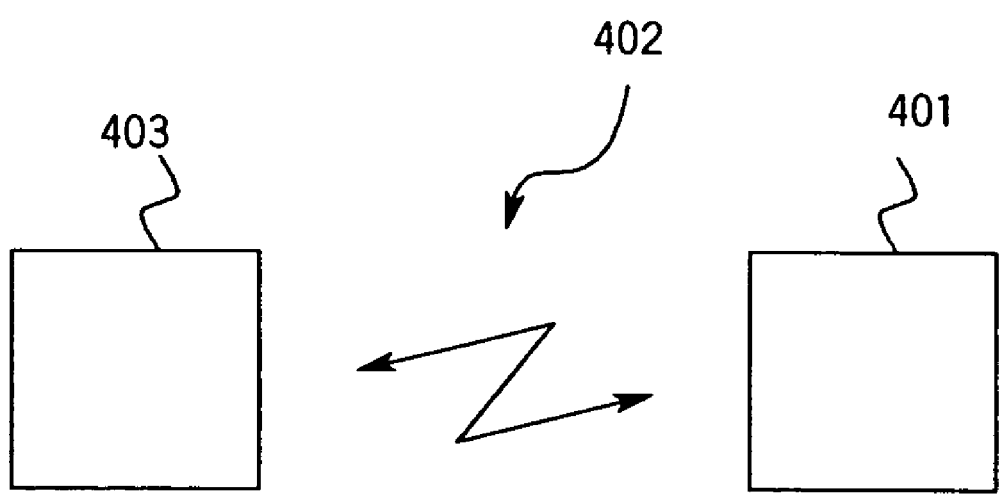
FIG. 10 illustrates how the program may be provided via a transmission medium.
Figure 11A:
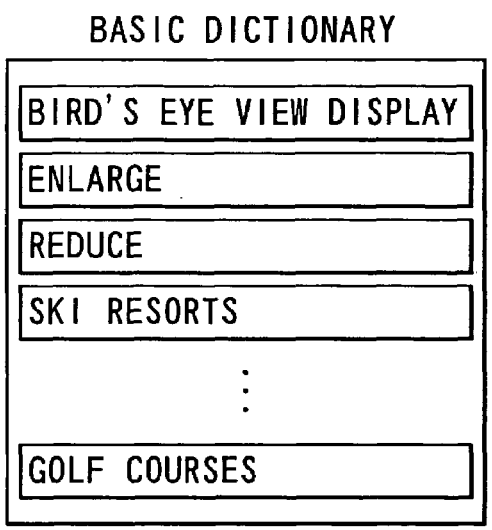
FIGS. 11A~11D illustrate the concept of the voice recognition dictionaries used in a navigation apparatus in the prior art to display a map containing a desired ski resort through voice instruction.
Figure 11B:
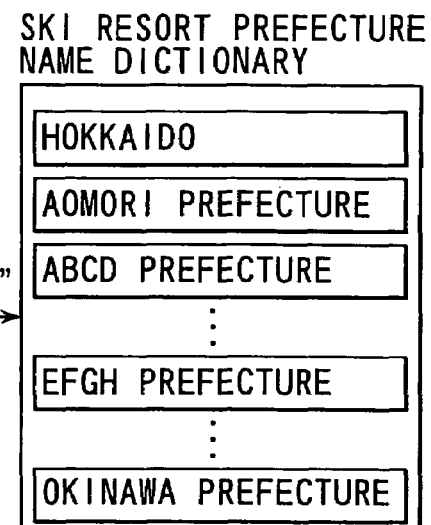
Figure 11C:
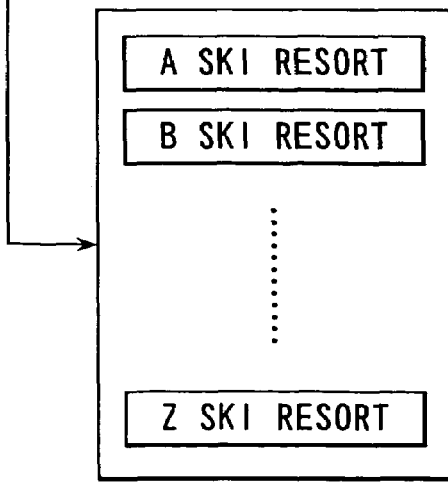
Figure 11D:
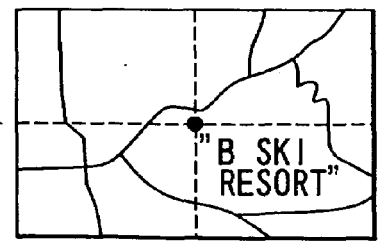

Alternatively, the control program, the recognition dictionaries, the neighboring prefecture dictionaries and the like may be provided via a transmission medium such as a communication line, a typical example of which is the Internet. In other words, the control program and the like may be converted to a signal that is transmitted through a transmission medium. FIG. 10 illustrates how this may be realized. A navigation apparatus 401 is the navigation apparatus explained earlier and has a function of connecting with a communication line 402. A computer 403 is a server computer in which the control program and the like are stored so that the control program and the like can be provided to the 401. The communication line 402 may be a communication line for Internet communication or personal computer communication, or it may be a dedicated communication line. The communication line 402 may be a telephone line or a wireless telephone line such as that for a mobile telephone connection.

While an explanation is given above in reference to the embodiments on an example in which when a successful search of a facility name is achieved in the voice unit 200, the results of the search are provided to the navigation apparatus 100, and in response, the navigation apparatus 100 displays a map of the area around the facility as part of the navigation processing which includes route guidance, the present invention is not limited to these particulars. Various types of navigation processing such as route search and route guidance may be implemented in the navigation apparatus 100 based upon the results of a successful search performed by the voice unit 200.

While an explanation is given above in reference to the embodiments on an example in which a search is performed by using a facility name dictionary prepared by incorporating the prefecture facility name dictionary corresponding to the specified prefecture and a neighboring prefecture facility name dictionary in the RAM, the present invention is not restricted by these particulars. A search may be performed by giving the highest priority to the specified prefecture with neighboring prefectures assigned with differing priority ranks. In addition, a search may be started using the facility name dictionary corresponding to the prefecture with the highest priority, and the processing may be finished after completing the search if a correlation value achieving a level equal to or higher than a specific level is obtained in referencing the prefecture.

While an explanation is given above in reference to the embodiments on an example in which the search target is specified through voice recognition, the present invention is not restricted by these particulars. It may be adopted when a search target is specified through an input device such as a keyboard, as well. In other words, it may be adopted in all modes of a search executed in units of specific classification blocks instead of handling all the search targets at once.

What is claimed is:

1. A voice reference apparatus that classifies a plurality of search targets into a plurality of division blocks in only one of which each of the plurality of search targets is included, searches for a search target by first specifying a division block and then specifying said search target and enables specification of, at least, said search target to be made by voice, the plurality of search targets belonging to a single category categorized according to attributes of search targets, comprising:

a first storage device in which recognition data related to the plurality of search targets corresponding to individual division blocks are stored so that each of the plurality of search targets is included in only one of the plurality of division blocks with no overlap of search targets between each of the plurality of division blocks;

a second storage device in which division block-related information indicating one or more other division blocks related to a given division block through a specific relationship in the category is stored;

a recognition data selection device that selects recognition data corresponding to a certain division block and one or more other division blocks related to said certain division block specified by said division block-related information from said first storage device, when said certain division block has been specified to search a certain search target; and a voice recognition processing device that performs voice recognition based upon voice recognition data generated by using said recognition data selected by said recognition data selection device and audio data corresponding to said search target specified by voice.

2. A voice reference apparatus according to claim 1, wherein:

said plurality of division blocks are public administrative zones;

said search target is located in one of said public administrative zones; and said division block-related information indicates one or more other public administrative zones related to a specified public administrative zone through a specific relationship.

3. A voice reference apparatus according to claim 2, wherein;

said public administrative zones are each constituted of a prefecture.

4. A voice reference apparatus according to claim 2, wherein;

said public administrative zones are each constituted of a state.

5. A voice reference apparatus according to claim 2, wherein;

said public administrative zones are each constituted of a country.

6. A voice reference apparatus according to claim 2, wherein;

said division block-related information indicates one or more other public administrative zones adjacent to a specified public administrative zone.

7. A voice reference apparatus according to claim 6, wherein;

said recognition data related to said search target includes information related to a public administrative zone in which said search target is located.

8. A voice reference apparatus according to claim 7, further comprising:

a display control device that implements control to display details related to results of a search of said search target on a display device, wherein;

when implementing control to display the details related to the results of the search of said search target, said display control device also displays on said display device information related to the public administrative zone in which said search target is located.

9. A voice recognition navigation apparatus, comprising:

a voice reference apparatus;

a map information storage device that stores map information; and a control device that implements control for providing route guidance based upon, at least, results of a search performed by said voice reference apparatus and said map information, wherein;

said voice reference apparatus, which classifies a plurality of search targets into a plurality of division blocks in only one of which each of the plurality of search targets is included, searches for a search target by first specifying a division block and then specifying said search target and enables specification of, at least, said search target to be made by voice, the plurality of search targets belonging to a single category categorized according to attributes of search targets, comprises:

a first storage device in which recognition data related to the plurality of search targets corresponding to individual division blocks are stored so that each of the plurality of search targets is included in only one of the plurality of division blocks with no overlap of search targets between each of the plurality of division blocks;

a second storage device in which division block-related information indicating one or more other division blocks related to a given division block through a specific relationship in the category is stored;

a recognition data selection device that selects recognition data corresponding to a certain division block and one or more other division blocks related to said certain division block specified by said division block-related information from said first storage device, when said certain division block has been specified to search a certain search target; and a voice recognition processing device that performs voice recognition based upon voice recognition data generated by using said recognition data selected by said recognition data selection device and audio data corresponding to said search target specified by voice.

10. A voice recognition navigation apparatus according to claim 9, wherein:

the plurality of search targets are a plurality of facilities;

the plurality of division blocks are a plurality of geographical areas; and each of said plurality of facilities is located in one of said plurality of geographical areas.

11. A voice recognition navigation apparatus according to claim 10, wherein:

the category to which the plurality of facilities belong includes one of a ski resort category, a golf course category, a theme park category, a restaurant category and an accommodations category.

12. A recording medium that records a voice reference control program for searching for a search target specified by voice, by first specifying a division block and then specifying said search target, said control program comprising:

an instruction for reading recognition data related to search targets, a plurality of said search targets being classified into a plurality of division blocks, so that each of the Plurality of search targets is included in only one of the plurality of division blocks with no overlap of search targets between each of the plurality of division blocks, and belonging to a single category categorized according to attributes of search targets;

an instruction for reading data related to division block-related information indicating one or more other division blocks related to a given block through a specific relationship in the category;

an instruction for selecting recognition data corresponding to a certain division block and one or more other division blocks related to said certain division block specified by said division block-related information when said certain division block has been specified to search a certain search target; and an instruction for implementing a voice recognition based upon voice recognition data generated by using said recognition data that have been selected and audio data corresponding to said search target specified by voice.

13. A data signal transmitted in a communication line and comprising a voice reference control program for searching for a search target specified by voice, by first specifying a division block and then specifying said search target, said control program comprising:

an instruction for reading recognition data related to search targets, a plurality of said search targets being classified into a plurality of division blocks so that each of the plurality of search targets is included in only one of the plurality of division blocks with no overlap of search targets between each of the plurality of division blocks, and belonging to a single category categorized according to attributes of search targets;

an instruction for reading data related to division block-related information indicating one or more other division blocks related to a given block through a specific relationship in the category;

an instruction for selecting recognition data corresponding to a certain division block and one or more other division blocks related to said certain division block specified by said division block-related information when said certain division block has been specified to search a certain search target; and an instruction for implementing a voice recognition based upon voice recognition data generated by using said recognition data that have been selected and audio data corresponding to said search target specified by voice.

14. A voice reference apparatus that classifies a plurality of search targets into a plurality of geographical areas in only one of which each of the plurality of search targets is located, searches for a search target by first specifying a geographical area and then specifying said search target and enables specification of, at least, said search target to be made by voice, the plurality of search targets belonging to a single category categorized according to attributes of search targets, comprising:

a first storage device in which recognition data related to the plurality of search targets corresponding to individual geographical areas are stored so that each of the plurality of search targets is included in only one of the plurality of division blocks with no overlap of search targets between each of the plurality of division blocks;

a second storage device in which geographical area-related information indicating one or more other geographical areas related to a given geographical area through a specific geographical relationship in the category is stored;

a recognition data selection device that selects recognition data corresponding to a certain geographical area and one or more other geographical areas related to said certain geographical area specified by said geographical area-related information from said first storage device, when said certain geographical area has been specified to search a certain search target; and a voice recognition processing device that performs voice recognition based upon voice recognition data generated by using said recognition data selected by said recognition data selection device and audio data corresponding to said search target specified by voice.

15. A voice reference apparatus according to claim 14, wherein:

the category to which the plurality of search targets belong includes one of a ski resort category, a golf course category, a theme park category, a restaurant category and an accommodations category.

* * * * *